(12) United States Patent
Tanaka

(10) Patent No.: US 8,390,678 B2
(45) Date of Patent: Mar. 5, 2013

(54) IMAGE PROCESSING DEVICE, IMAGE PROCESSING METHOD AND DISPLAY

(75) Inventor: Takahiro Tanaka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/204,388

(22) Filed: Aug. 5, 2011

(65) Prior Publication Data

US 2012/0212478 A1 Aug. 23, 2012

(30) Foreign Application Priority Data

Feb. 21, 2011 (JP) .................................. 2011-34995

(51) Int. Cl.
*H04N 13/04* (2006.01)
*G06T 15/00* (2011.01)

(52) U.S. Cl. ......................................... 348/51; 345/419

(58) Field of Classification Search .................. None
See application file for complete search history.

(56) References Cited

U.S. PATENT DOCUMENTS

| 2002/0085116 A1* | 7/2002 | Kuwano et al. ............... 348/465 |
| 2010/0085478 A1* | 4/2010 | Yamamoto et al. ........... 348/452 |
| 2011/0109795 A1* | 5/2011 | Inamura et al. ............... 348/441 |
| 2011/0242104 A1* | 10/2011 | Zhang et al. .................. 345/419 |
| 2012/0038745 A1* | 2/2012 | Yu et al. .......................... 348/46 |
| 2012/0084652 A1* | 4/2012 | Martinez Bauza et al. ... 715/719 |
| 2012/0099836 A1* | 4/2012 | Welsh et al. ................... 386/230 |

FOREIGN PATENT DOCUMENTS

| JP | 2004-274125 | 9/2004 |
| JP | 2006-325165 | 11/2006 |
| JP | 2010-273333 | 12/2010 |
| WO | WO 2008115222 A1 * | 9/2008 |

* cited by examiner

*Primary Examiner* — David Czekaj
*Assistant Examiner* — Kevin McInnish
(74) *Attorney, Agent, or Firm* — Blakely, Sokoloff, Taylor & Zafman LLP

(57) ABSTRACT

According to one embodiment, a display includes a telop detector, a depth corrector, a parallax image generator, and a display module. The telop detector is configured to calculate a probability of each pixel block being a telop. The pixel block is composed of a plurality of pixels in an input image. The depth corrector is configured to correct a predetermined depth of each pixel block in such a manner that as the probability is higher, the depth approaches a center of depth. The parallax image generator is configured to generate a parallax image of the input image based on the corrected depth. The display module is configured to display the parallax image stereoscopically.

11 Claims, 2 Drawing Sheets

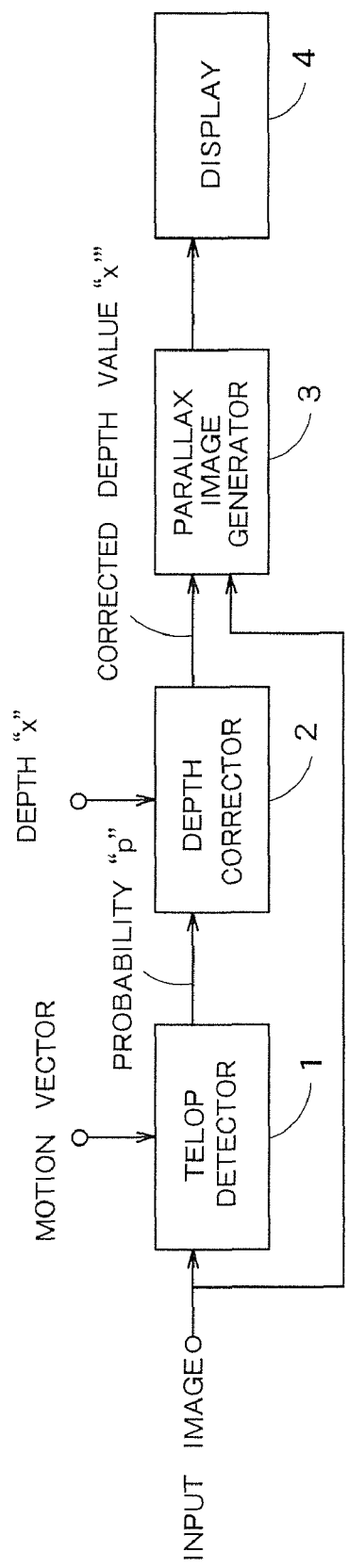
F I G. 1

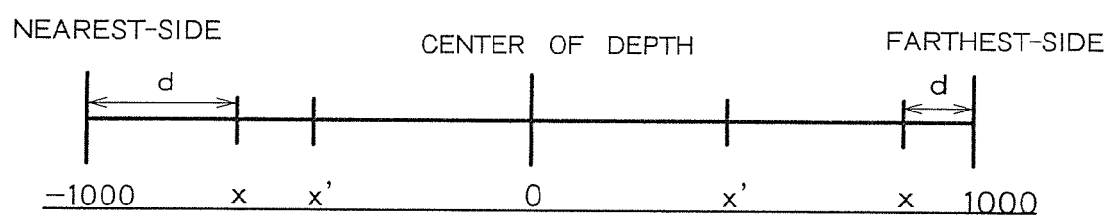
F I G. 2

IMAGE PROCESSING DEVICE, IMAGE PROCESSING METHOD AND DISPLAY

CROSS REFERENCE TO RELATED APPLICATIONS

This application is based upon and claims the benefit of priority from the prior Japanese Patent Application No. 2011-34995, filed on Feb. 21, 2011, the entire contents of which are incorporated herein by reference.

FIELD

Embodiments described herein relate generally to an image processing device, an image processing method and a display.

BACKGROUND

Recently, 3D displays are widely used. Some parallax images viewed from viewpoints different from each other are displayed on the 3D display.

In some displays, objects at the nearest-side or at the farthest-side may be doubly-seen. Especially, there is a problem that if characters are doubly-seen, it is so difficult to read the characters.

BRIEF DESCRIPTION OF THE DRAWINGS

FIG. 1 is a schematic block diagram showing a display according to one embodiment.

FIG. 2 is a diagram showing an example of the depth "x".

DETAILED DESCRIPTION

According to one embodiment, a display includes a telop detector, a depth corrector, a parallax image generator, and a display module. The telop detector is configured to calculate a probability of each pixel block being a telop. The pixel block is composed of a plurality of pixels in an input image. The depth corrector is configured to correct a predetermined depth of each pixel block in such a manner that as the probability is higher, the depth approaches a center of depth. The parallax image generator is configured to generate a parallax image of the input image based on the corrected depth. The display module is configured to display the parallax image stereoscopically.

Embodiments will now be explained with the attached figures.

FIG. 1 is a schematic block diagram showing a display according to one embodiment. The display has a telop detector 1, a depth corrector 2, a parallax image generator 3 and a display module 4. For example, at least a part of the telop detector 1, the depth corrector 2 and the parallax image generator 3 can be implemented as an image processing device by a semiconductor chip or software.

The telop detector 1 calculates a probability "p" of each pixel block in an input image being a telop (hereinafter, referred to as probability "p"). The depth corrector 2 corrects a predetermined depth "x" of the pixel block to generate a corrected depth "x'" so that as the probability "p" is higher, the corrected depth "x'" approach the center of the depth. The parallax image generator 3 generates parallax images of the input image based on the corrected depth "x'". The display module 4 displays the parallax images so that the parallax images are seen stereoscopically.

Hereinafter, each module will be described in detail.

The telop detector 1 calculates the probability "p". The pixel block is composed of some pixels in the input image. If the number of the pixels in the pixel block is too few, accuracy of the probability "p" decreases. On the other hand, if the number of the pixels in the pixel block is too many, the processing amount of the telop detector 1 becomes large. Taking the above into account, the pixel block is, for example, composed of "16×16" pixels. Here, the telop includes captions and channel indication, and so on.

Various methods to calculate the probability "p" can be conceivable. In one of examples, coordinates where the telop is often displayed are learned in advance using a lot of sample images, and the probability "p" can be set higher as the coordinates of the center of the pixel block is closer to the learned coordinates. For example, the captions are often displayed at the lower side of the screen, and the channel indication is often displayed at upper right or upper left side of the screen. Therefore, the telop detector 1 can set the probability "p" to be higher as the pixel block locates closer to such positions.

Furthermore, the luma gradient in the pixel block which is a telop is learned using the sample images in advance, and the probability "p" can be set higher as the luma gradient in the pixel block is closer to the learned luma gradient. The luma gradient means, for example, a value obtained by accumulating absolute differences of neighboring pixel values in the pixel block.

Additionally, the telop detector 1 receives the motion vector of the pixel block from outside, and the probability "p" can be set higher as the length of the motion vector is smaller. This is because the telop is, in general, hardly moves.

Alternatively, the probability "p" can be calculated by performing character recognition. The method to calculate the probability "p" is not limited to one of the above methods, and the above methods can be combined or the probability "p" can be calculated by other method.

The depth corrector 2, based on the probability "p", corrects the predetermined depth "x" inputted from outside. The depth "x" includes information indicating that the depth of each pixel block is at near-side or at far-side and how far the pixel block is seen from the center of the depth.

FIG. 2 is a diagram showing an example of the depth "x". In the present embodiment, the depth of the pixel block displayed at the nearest-side is set "−1000", that displayed at the center of the depth is set "0", and that displayed at farthest-side is set "1000". That is, the depth "x" can be "−1000" to "1000".

The depth "x" can be added to the input image in advance, or can be generated by a depth generator (not shown) based on the characteristics of the input image. For example, the depth "x" can be calculated based on the length of the motion vector. Furthermore, the structure of the whole of the input image is determined based on the characteristics such as colors or edges of the input image, and the depth "x" can be calculated by comparing the characteristics with those of pre-learned images. Additionally, human's face is detected in the input image, and the depth "x" can be calculated according to the position and/or size of the detected face applying to the pre-determined template.

The depth corrector 2 corrects the depth "x" to generate the corrected depth "x'" so that as the probability "p" is higher, the corrected depth "x'" approaches "0", that is, the center of the depth. Furthermore, as the depth "x" is closer to the nearest-side or the farthest-side, the depth corrector 2 sets the amount of correction to be larger. More specifically, the depth corrector 2 performs as the followings.

An amount of correction "rp" based on the probability "p" is calculated with the following equation (1).

$$rp = \exp\left(-\frac{(1-p)^2}{2*p_{th}^2}\right) \quad (1)$$

Here, the "$p_{th}$" is a predetermined threshold. The amount of correction "rp" is equal to or smaller than "1", and as the probability is higher, the amount of correction "rp" becomes larger.

Furthermore, the amount of correction "rd" based on a distance "d" from the nearest-side or the farthest-side which is expressed by "d=1000−|x|" is calculated with the following equation (2).

$$rd = \exp\left(-\frac{d^2}{2*d_{th}^2}\right) \quad (2)$$

Here, the "$d_{th}$," is a predetermined threshold. The amount of correction "rd" is equal to or smaller than "1", and as the distance "d" is smaller, in other words, farther from the center of the depth, the amount of correction "rd" becomes larger.

Next, the conclusive amount of correction "r" is calculated with the following equation (3) based on the amount of corrections "rp" and "rd", and then, the corrected depth "x" is calculated with the following equation (4).

$$r=rp*rd*rs \quad (3)$$

$$x'=x*(1-r) \quad (4)$$

Here, the "rs" is a predetermined constant ("0" to "1"). The amount of correction "r" can be "0" to "1", and as the amount of corrections "rp" and "rd" are larger, the amount of correction "r" becomes larger. The constant "rs" shows a maximum amount of correction of the depth. For example, when "rs=0.3", the absolute depth is lowered at "30"% at maximum.

Note that, the above is only an example of a method to calculate the corrected depth "x", and a calculation method is not limited thereto. For example, instead of the equations (1) and (2), linear functions can be applied to calculate the amount of corrections "rp" and "rd" more simply.

Based on the corrected depth "x", the parallax image generator 3 generates parallax images of the input image. When the display module 4 of the present embodiment is used for 3D display with glasses, the parallax image generator 3 generates two parallax images for left eye and right eye. When the display module 4 is used for glassesless 3D display, for example, the parallax image generator 3 generates nine parallax images viewed from nine directions. For example, in a parallax image viewed from a left direction, the pixel block existing at near-side (that is, having small corrected depth "x") is seen shifted to the right side comparing to the pixel block existing at far-side (that is, having large corrected depth "x"). Therefore, based on the corrected depth "x", the parallax image generator 3 shifts the pixel block existing at near-side to the right side. As the corrected depth "x" is larger, the shifting amount is set larger. Then, positions where the pixel block was originally located are properly interpolated by using the surrounding pixels.

The display module 4 displays the generated parallax images stereoscopically. For example, in a case of the 3D display with glasses, the parallax images for the right eye and the left eye are displayed by turns in a predetermined timing. On the other hand, in the glassesless 3D display, lenticular lenses are arranged on the display module 4, for example. Then, the some parallax images are displayed at the same time, and the user views one of the parallax images with the right eye and another one of the parallax images with the left eye. In either case, the image can be seen stereoscopically by viewing different parallax images with the right eye and the left eye. Because the depth "x" is corrected as above, the pixel block existing at around the nearest-side or the farthest-side and having the high probability "p", is displayed near the center of the depth.

As stated above, in the present embodiment, the depth is corrected so that the telop existing at around the nearest-side or the farthest-side approaches the center of the depth. As a result, the telop is displayed far from the nearest-side or the farthest-side, thereby suppressing the telop being doubly-seen. Therefore, the telop can be stereoscopically displayed with high quality.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the inventions.

The invention claimed is:

1. A display comprising:
    a telop detector configured to calculate a probability of each pixel block being a telop, the pixel block being composed of a plurality of pixels in an input image;
    a depth corrector configured to correct a predetermined depth of each pixel block so that, as the probability is higher, the depth approaches a center of depth;
    a parallax image generator configured to generate a parallax image of the input image based on the corrected depth; and
    a display module configured to display the parallax image stereoscopically.

2. The display of claim 1, wherein the telop detector is configured to calculate the probability based on at least one of a center coordinate of the pixel block and a luma gradient in the pixel block.

3. The display of claim 1, wherein the telop detector is configured to calculate the probability based on length of a motion vector of the pixel block in the input image.

4. The display of claim 1, wherein the depth corrector is configured to set an amount of correction to be larger as the depth before correcting is farther from the center of the depth.

5. The display of claim 1, wherein the depth corrector is configured to correct the depth based on following equations (1) to (4):

$$rp = \exp\left(-\frac{(1-p)^2}{2*p_{th}^2}\right) \quad (1)$$

$$rd = \exp\left(-\frac{d^2}{2*d_{th}^2}\right) \quad (2)$$

$$r = rp * rd * rs \quad (3)$$

$$x' = x*(1-r) \quad (4)$$

where the "p" is the probability of the pixel block being the telop, the "x" and the "x" are the depth before and after correcting, respectively, the "d" is a distance between the depth before correcting and a nearest-side or farthest-side of the depth, the "$p_{th}$" is a first constant, the "$d_{th}$" is a second constant, and the "rs" is a third constant within 0 to 1.

6. An image processing device comprising:
a telop detector configured to calculate a probability of each pixel block being a telop, the pixel block being composed of a plurality of pixels in an input image; and
a depth corrector configured to correct a predetermined depth of the pixel block in such a manner that as the probability is higher, the depth approaches a center of depth.

7. The device of claim 6, wherein the telop detector is configured to calculate the probability based on at least one of a center coordinate of the pixel block and a luma gradient in the pixel block.

8. The device of claim 6, wherein the telop detector is configured to calculate the probability based on length of a motion vector of the pixel block in the input image.

9. The device of claim 6, wherein the depth corrector is configured to set an amount of correction to be larger as the depth before correcting is farther from the center of the depth.

10. The device of claim 6, wherein the depth corrector is configured to correct the depth based on following equations (5) to (8):

$$rp = \exp\left(-\frac{(1-p)^2}{2*p_{th}^2}\right) \quad (5)$$

$$rd = \exp\left(-\frac{d^2}{2*d_{th}^2}\right) \quad (6)$$

$$r = rp * rd * rs \quad (7)$$

$$x' = x^*(1-r) \quad (8)$$

where the "p" is the probability of the pixel block being the telop, the "x" and the "x" are the depth before and after correcting, respectively, the "d" is a distance between the depth before correcting and a nearest-side or farthest-side of the depth, the "$p_{th}$" is a first constant, the "$d_{th}$" is a second constant, and the "rs" is a third constant within 0 to 1.

11. An image processing method comprising:
calculating a probability of each pixel block being a telop, the pixel block being composed of a plurality of pixels in an input image;
and correcting a predetermined depth of the pixel block so that, as the probability is higher, the depth approaches a center of depth.

\* \* \* \* \*